Patented Feb. 12, 1935

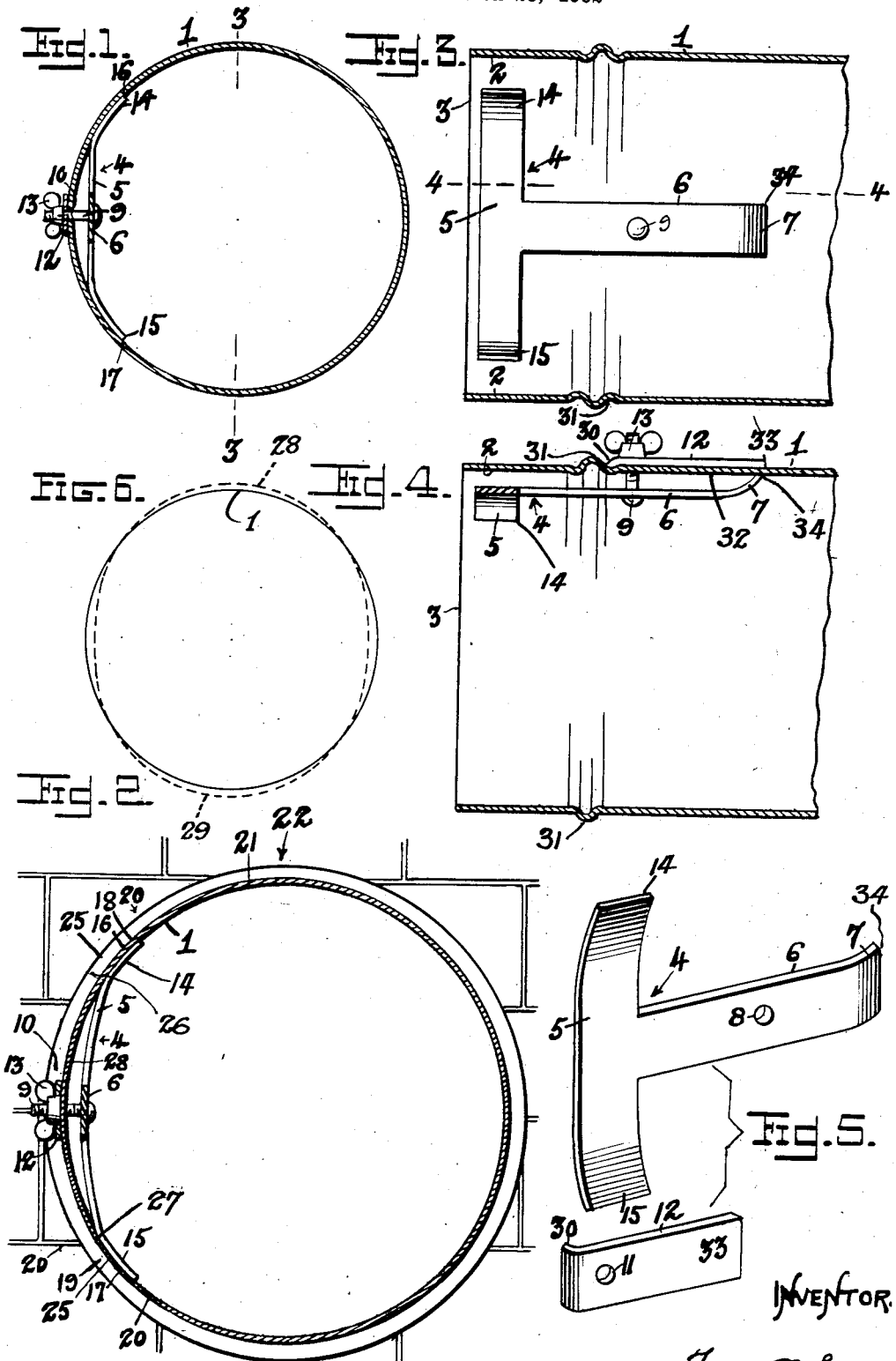

1,990,910

UNITED STATES PATENT OFFICE 1,990,910

STOVE PIPE COUPLING

Tom O. Logan, Edgemont, S. Dak., assignor of one-half to John W. Jones, Edgemont, S. Dak.

Application March 28, 1932, Serial No. 601,594

11 Claims. (Cl. 126—318)

This invention relates to improvements in a stove pipe and has for its object to provide means whereby such a pipe may be so secured to the chimney that it cannot accidentally become displaced therefrom.

Another object of the invention is to provide in a stove pipe means whereby the same may be securely clamped to a chimney.

A still further object of the invention is to provide in a stove pipe a jaw and means whereby the same may be caused to cooperate with the wall of a chimney opening to securely fasten the pipe in said opening.

With the above and such other objects in view as may hereinafter more fully appear, I have invented the device shown in the accompanying drawing, in which:

Figure 1 is a sectional end view of a stove pipe, embracing my invention a stiffening groove being eliminated to clarify the drawing;

Figure 2 is an enlarged section showing a pipe embracing my invention clamped in the chimney;

Figure 3 is a section on line 3—3 of Figure 1;

Figure 4 is a section on line 4—4 of Figure 3;

Figure 5 is an enlarged perspective view of my device removed from the pipe.

Figure 6 is a diagrammatic view showing a stove pipe in normal position, in full lines, and as distorted in dotted lines, the latter being accentuated.

Like reference characters indicate like parts, throughout the following specification, and in the several views in the drawing in which 1 indicates a stove pipe. To the inner surface 2 of the end 3 of the pipe is secured a T-shaped clamp 4, having a jaw 5, and shank 6, curved to engage said surface 2 at its free end 7, to hold the jaw 5, and shank 6 normally spaced from said surface 2. The shank 6 is provided with an intermediate aperture 8, through which a screw 9 projects, said screw also projecting through an alining aperture 10 in said pipe and aperture 11 in a second clamping member 12, and upon which screw a wing nut 13 is threaded so that upon screwing down, the T-head 5, which is of greater diametrical arc than the pipe 1, will be drawn tightly into the curvature of said pipe. This action will cause the terminals 14 and 15 to be forced against the portions 16 and 17 of said pipe portions between said terminals and the parts 18 and 19 of the wall 20 of the pipe opening 21 of the chimney 22.

In Figures 1 and 3 the normal position of the clamp member 4 with the nut 13 loose, is illustrated, while Figure 2 illustrates the member 4 in operative position, the nut 13 being screwed down as far as possible after the pipe end 3 is placed in the pipe opening 20 of said chimney. In Figure 6 is shown a diagrammatical view of a stove pipe in normal position, in full lines, and as distorted by the clamping device, in dotted lines. The distorting action shown in Figure 6 is indicated in Figure 2 by the bulging out of the pipe at 28 and 29, whereby the same is forced tightly against said wall 20. The binding member 12 has a curved in end 30 to fit into the stiffening groove 31 of the pipe 1, whereby said washer will be held parallel with the shank 6, thus providing a reinforcement for the part 32 of the pipe under said shank, the terminal 33 of the member 12 extending to or beyond the terminal 34 of said shank 6. If it were not for the elongated member 12, the action of the nut 13, when screwed in would have a tendency to cause the terminal 34 of the shank 6, to push through the pipe. The purpose of the curved rod 7 is in order to give a certain resiliency or spring action to member 4, whereby the head 5 will immediately release itself upon unscrewing the nut 13.

Having described my invention that which I claim to be new and desire to procure by Letters Patent is:

1. In a device as described, a stove pipe, a pair of clamp members adjacent one end thereof, one inwardly and one outwardly of the pipe, means for cooperatively clamping said members against the pipe, the inner member being T-shaped and with the head thereof in chordal relation to the inner periphery of the pipe whereby the end of the pipe, when inserted in a flue opening, can be distorted by the clamping of the members to hold the pipe therein, said T-member having a flat head with curved terminals.

2. The device as claimed in claim 1, said T-member having a flat head with curved terminals, the shank of said T-member having its terminal curved to engage said stove pipe.

3. The device, as claimed in claim 1, said T-member having a flat head with curved terminals, the shank of said T-member having its terminal curved to engage said stove pipe, said means comprising a screw connecting said clamp members through an opening in the last pipe.

4. The device, as claimed in claim 1, said T-member having a flat head with curved terminals, the shank of said T-member having its terminal curved to engage said stove pipe, said means comprising a screw connecting said clamp members through an opening in the last pipe, and a wing nut on the screw to actuate said members.

5. In a device as described, a stove pipe, a pair of clamp members adjacent one end thereof, one inwardly and one outwardly of the pipe, means for cooperatively clamping said members against the pipe, the inner member being T-shaped and with the head thereof in chordal relation to the inner periphery of the pipe whereby the end of the pipe, when inserted in a flue opening, can be distorted by the clamping of the members to hold the pipe therein.

6. In a device, as described, a stove pipe and means for distorting one end thereof, to bind the same in a chimney, pipe opening, said means including a pair of clamp members, one inwardly and one outwardly of said stove pipe, and means outwardly of the stove pipe to actuate said clamp members, the inner of said clamp members being T-shaped with its head in chordal relation to the inner periphery of the pipe and having a shank with which the outer clamp member is parallel.

7. The device as claimed in claim 6, and means for holding said shank and outer clamp parallel.

8. The device as claimed in claim 6, and means for holding said shank and outer clamp parallel, said T-head having angular terminals.

9. The device as claimed in claim 6, the head of said inner clamp member when actuated to clamping position being curved on an arc of greater radius than that of the stove pipe.

10. The device as claimed in claim 6, said shank having its free terminal bent against the pipe wall.

11. The device as claimed in claim 6, said actuating means including a screw bolt connecting the shank with the stove pipe and a wing nut on the outer end of the screw.

TOM O. LOGAN.